United States Patent
Choe

(10) Patent No.: US 8,924,577 B2
(45) Date of Patent: *Dec. 30, 2014

(54) PEER-TO-PEER REMEDIATION

(75) Inventor: Calvin Choon-Hwan Choe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,527

(22) Filed: Sep. 13, 2012

(65) Prior Publication Data

US 2013/0007295 A1     Jan. 3, 2013

Related U.S. Application Data

(63) Continuation of application No. 11/297,681, filed on Dec. 8, 2005, now Pat. No. 8,291,093.

(51) Int. Cl.
| | |
|---|---|
| *G06F 15/16* | (2006.01) |
| *G06F 15/173* | (2006.01) |
| *G06F 21/57* | (2013.01) |
| *H04L 29/08* | (2006.01) |
| *H04L 29/06* | (2006.01) |

(52) U.S. Cl.
CPC ................ *H04L 67/34* (2013.01); *G06F 21/57* (2013.01); *H04L 63/20* (2013.01); *H04L 63/1433* (2013.01)
USPC ........... 709/229; 709/217; 709/218; 709/219; 709/225; 709/227; 709/228; 709/236; 709/237

(58) Field of Classification Search
USPC .......... 709/217–219, 225, 227–229, 236–237
See application file for complete search history.

(56) References Cited

U.S. PATENT DOCUMENTS

| | | | | |
|---|---|---|---|---|
| 5,701,427 A | * | 12/1997 | Lathrop | 709/237 |
| 5,737,601 A | * | 4/1998 | Jain et al. | 707/622 |
| 5,752,042 A | | 5/1998 | Cole | |
| 5,806,075 A | * | 9/1998 | Jain et al. | 1/1 |

(Continued)

FOREIGN PATENT DOCUMENTS

| | | |
|---|---|---|
| EP | 0811942 | 12/1997 |
| EP | 0 841 615 | 5/1998 |

(Continued)

OTHER PUBLICATIONS

International Search Report, Reference 314525 02 WO, Application No. PCT/US2006/047019, May 1, 2007.

(Continued)

*Primary Examiner* — Edward Kim
(74) *Attorney, Agent, or Firm* — John Jardine; Kate Drakos; Micky Minhas

(57) ABSTRACT

A network in which peer-to-peer remediation is provided to keep clients in the network up-to-date. As network clients establish peer-to-peer connections, they exchange status information. The status information allows the clients to mutually identify whether one client is more out-of-date than another. The more up-to-date client provides update information to the more out-of-date client. To preserve the integrity of the update process, updates are provided as signed binary files and are only applied by the client receiving the update if the binary file may be authenticated by the recipient.

20 Claims, 4 Drawing Sheets

(56) References Cited

U.S. PATENT DOCUMENTS

| | | | |
|---|---|---|---|
| 5,845,077 A | 12/1998 | Fawcett | |
| 6,205,551 B1 | 3/2001 | Grosse | |
| 6,269,456 B1 | 7/2001 | Hodges et al. | |
| 6,317,754 B1* | 11/2001 | Peng | 707/610 |
| 6,381,631 B1* | 4/2002 | van Hoff | 709/202 |
| 6,453,404 B1 | 9/2002 | Bereznyi | |
| 6,493,871 B1 | 12/2002 | McGuire et al. | |
| 6,629,138 B1* | 9/2003 | Lambert et al. | 709/224 |
| 6,681,342 B2 | 1/2004 | Johnson et al. | |
| 6,754,664 B1 | 6/2004 | Bush | |
| 6,816,900 B1 | 11/2004 | Vogel | |
| 6,892,317 B1 | 5/2005 | Sampath et al. | |
| 6,990,591 B1* | 1/2006 | Pearson | 726/22 |
| 7,080,372 B1* | 7/2006 | Cole | 717/173 |
| 7,130,921 B2 | 10/2006 | Goodman et al. | |
| 7,287,068 B1 | 10/2007 | Eriksson et al. | |
| 7,313,791 B1 | 12/2007 | Chen et al. | |
| 7,360,237 B2 | 4/2008 | Engle | |
| 7,630,381 B1 | 12/2009 | Roskind | |
| 7,716,660 B2 | 5/2010 | Mackay | |
| 7,984,493 B2 | 7/2011 | Jones | |
| 2002/0010866 A1* | 1/2002 | McCullough et al. | 713/201 |
| 2002/0049760 A1* | 4/2002 | Scott et al. | 707/10 |
| 2002/0049850 A1* | 4/2002 | Fiori et al. | 709/227 |
| 2002/0116151 A1 | 8/2002 | Brown et al. | |
| 2003/0028585 A1* | 2/2003 | Yeager et al. | 709/201 |
| 2003/0028805 A1* | 2/2003 | Lahteenmaki | 713/201 |
| 2003/0115251 A1* | 6/2003 | Fredrickson et al. | 709/201 |
| 2003/0233455 A1* | 12/2003 | Leber et al. | 709/226 |
| 2004/0068662 A1 | 4/2004 | Ho et al. | |
| 2004/0088564 A1 | 5/2004 | Norman | |
| 2004/0205419 A1 | 10/2004 | Liang et al. | |
| 2004/0250107 A1 | 12/2004 | Guo | |
| 2004/0261071 A1 | 12/2004 | Chuang et al. | |
| 2005/0015622 A1 | 1/2005 | Williams et al. | |
| 2005/0050378 A1 | 3/2005 | Liang | |
| 2005/0071838 A1 | 3/2005 | Hatasaki | |
| 2005/0076325 A1 | 4/2005 | Bergin et al. | |
| 2005/0086473 A1 | 4/2005 | Barkley et al. | |
| 2005/0086526 A1 | 4/2005 | Aguirre | |
| 2005/0132216 A1 | 6/2005 | Franczek et al. | |
| 2005/0132382 A1 | 6/2005 | McGuire et al. | |
| 2005/0166198 A1* | 7/2005 | Gigliotti et al. | 717/172 |
| 2006/0075103 A1* | 4/2006 | Cromer et al. | 709/225 |
| 2006/0184651 A1 | 8/2006 | Tirnumala | |
| 2007/0101405 A1 | 5/2007 | Engle | |
| 2007/0136297 A1* | 6/2007 | Choe | 707/10 |

FOREIGN PATENT DOCUMENTS

| | | |
|---|---|---|
| JP | 2000250743 A | 9/2000 |
| JP | 2001-119478 | 4/2001 |
| JP | 2002-82907 | 3/2002 |
| JP | 2003-288225 | 10/2003 |
| JP | 2004118482 | 4/2004 |
| JP | 2004/213508 | 7/2004 |
| JP | 2005-51351 | 2/2005 |
| JP | 2005222453 A | 8/2005 |
| WO | WO 0184313 | 11/2001 |
| WO | WO 02/065282 A2 | 8/2002 |
| WO | WO 03/015377 | 2/2003 |

OTHER PUBLICATIONS

CN First Office Action, Application No. 200680046044.1, Sep. 4, 2009.
CN Decision on Rejection, Application No. 200680046044.1, Jan. 26, 2011.
EP Search Report, Reference EP37552RK900peu, Application No. 05111675.4-1243, Dec. 27, 2007.
CN First Office Action, Application No. 200510137028.0, Sep. 5, 2008.
JP Notice of Rejection, Application No. 2005-360913, Feb. 3, 2012.
EP Summons to Attend Oral Proceedings, Reference EP37552RK900peu, Application No. 05111675.4-1243/1672490, Mar. 27, 2012.
Berket, "PKI-based Security for Peer-to-Peer Information Sharing", Proceedings of the Fourth International Conference on Peer-to-Peer Computing, 2004, p. 45-52.
Examiner's First Report from Australian patent application No. 2005239708, Apr. 16, 2010.
Japanese Office Action from Japanese Application 2008-544550 dated Jul. 20, 2011.
Official Action from the Patent Office of the Russian Federation issued in Russian Patent Application No. 2412-134904RU/8132, issued on Nov. 17, 2009. Partial translation included.
Castro, M. et al. "SplitStream: High-Bandwidth Content Distribution in Cooperative Environments," Microsoft Research, Cambridge, UK., and Rice University, Houston, Texas, 2003.
Cohen, B., "Incentives Build Robustness in BitTorrent," bram@bitconjurer.org, May 22, 2003.
M.Izal et al. "Dissecting BitTorrent: Five Months in a Torrent's Lifetime," PAM'2004, 5th annual Passive & Active Measurement Workshop, Apr. 19-20, 2004, Antibes Juan-les-Pins, France—Published in LNCS vol. 3015.
Website: "BitTorrent: Protocol Specification," available at http://www.bitconjurer.org/BitTorrent/protocol.html, pp. 1-8, earliest known date Feb. 17, 2004. Retrieved Dec. 8, 2004.
Raim, et al., "Large Scale Update Distribution with BitTorrent", Oct. 2004, Lehigh University Department of Computer Science.
Communication pursuant to Article 94(3) EPC from European Patent Application 05 111 675.4, May 27, 2008.
European Search Report from European Patent Application 05 111 675.4, Dec. 27, 2007.
International Search Report in PCT/US2005/047019, dated Dec. 8, 2006, 9 pages.
Gribble, "What can Databases Do for Peer-to-Peer?", Web DB Workshop on Databases and the Web, 2001.
Datta, "Updates in Highly Unreliable, replicated Peer-to-Peer Systems", Proceedings of the 23rd International Conference on Distributed Computing Systems (ICDCS'03), 1063-6927/03,2003 IEEE.
Hammer, P.K., et al., "An artificial immune system architecture for computer security applications," Abstract from June 2002. http://ieeexplore.iee.org/search/srchabstract.jsp?arnumber=1011540&isnumber=21802&punumber=4235&k2dockey=1011540@ieeejrns&query=%28+%28+peer-to-peer++and+network+and+health+and+monitoring%3Cin%3Eti+%29+%3Cor%3E+%28+peer-to-peer++and+network+and+health+and+monitoring%3Cin%3Eab+%29+%29%pos=2.
Sterritt, R., et al., "Personal autonomic computing self-healing tool," Engineering of Computer-Based Systems, 2004, Proceedings, 11th International Conference and Workshop on the May 24-27, 2004, pp. 513-520. Abstract from http://ieeexplore.iee.org/search/freesrchabstract.jsp?arnumber=1316741&isnumber=29178&punumber=9203&k2dockey=1316741@ieeecnfs&query=%28+%28+peer-to-peer++and+network+and+health+and+monitoring%3Cin%3Eti+%29+%3Cor%3E+%28+peer-to-peer++and+network+and+health+and+monitoring%3Cin%3Eab+%29+%29%pos=15.
Abielmona, R., et al., "Can an intelligent society of robots survive in a hostile environment?" Abstract from May 2003. http://ieeexplore.iee.org/search/srchabstract.jsp?arnumber=1226122&isnumber=27521&punumber=8688&k2dockey=1226122@ieeecnfs&query=%28+%28+peer-to-peer++and+network+and+health+and+monitoring%3Cin%3Eti+%29+%3Cor%3E+%28+peer-to-peer++and+network+and+health+and+monitoring%3Cin%3Eab+%29+%29%pos=23.
EP Provision of the minutes of the oral proceedings for Application No. 05 111 675.4-1957, Reference EP37552RK900peu, Feb. 22, 2013.
EP Summons to attend oral proceeding for Application No. 05111675.4-1243/1672490 reference EP37552RK900peu, Oct. 23, 2012.
Wikipedia, "BitTorrent ", Dec. 12, 2004.
JP Notice of Rejection for Application No. 2005-360913, Sep. 14, 2012.

(56) References Cited

OTHER PUBLICATIONS

EP Communication for Application No. 06845101.2-1244/1958093 PCT/US2006047019, Reference FB20101, Feb. 4, 2013.
EP Brief Communication for Application No. 05111675.4-1957/1672490, Reference EP37552RK900peu, Feb. 6, 2013.
JP Decision to Decline the Amendment for Application No. 2005-360913, Feb. 1, 2013.
JP Final Rejection for Application No. 2005-360913, Feb. 1, 2013.
IN First Examination Report for Application No. 3252/DEL/2005, May 16, 2013.
CN Decision on Reexamination for Application No. 200680046044.1, Jan. 17, 2014.
EP Notice of Allowance for Application No. 06 845 101.2—1853, Reference FB20101, Sep. 18, 2013.
CN Notice on the Second Office Action for Application No. 200680046044.1, Oct. 19, 2010.
CN Notice on the Third Office Action for Application No. 200680046044.1, May 26, 2014.
CN Second Office Action for Application No. 200510137028.0, Sep. 4, 2009.
CN Third Office Action for Application No. 200510137028.0, Jan. 8, 2010.
CN Notice on the Fourth Office Action for Application No. 200510137028.0, Apr. 14, 2010.
KR Preliminary Rejection for Application No. 10-2005-0122303, Jan. 31, 2012.
CA Office Action for Application No. 2,529,966, Mar. 8, 2013.
MX Office Action for Application No. PA/a/2005/013575, Dec. 2, 2009.

\* cited by examiner

PEER-TO-PEER REMEDIATION

RELATED APPLICATIONS

This application is a continuation of, and claims benefit of, U.S. patent application Ser. No. 11/297,681 that was filed on Dec. 8, 2005, and that is incorporated herein in its entirety.

BACKGROUND

Maintaining the integrity of computer systems has become an increasingly important function as the role of computer systems in all aspects of modern life has expanded. Simultaneously, the threats to computer systems have grown. Networked computer systems are particularly vulnerable to threats posed by "viruses," "spyware" and "hackers" bent on stealing information or disrupting operation of the computer system.

One approach to increasing the integrity of networked computer systems is through the use of protective software. Each client to connect to the network is equipped with software that can detect and thwart threats to the networked computer system. Firewalls, antivirus software and antispyware software are examples of protective software that is widely used on network clients. A drawback of such protective software is that, to be fully effective, the software must be updated to address new threats as the threats are created.

To facilitate easy updates, protective software often includes data files holding descriptions of threats that the software can detect or prevent. These data files may be easily updated, such as by downloading from a server new files to describe new threats. Nonetheless, the operator of each client connected to a network must take action to keep the client up-to-date. An operator may take action explicitly, such as by periodically downloading new data files. Alternatively, the operator may configure the protective software to automatically download new data files. Sometimes, the operator does not properly update, operate or configure protective software, leaving vulnerabilities.

Vulnerabilities caused by improper use of protective software are sometimes addressed through a "quarantine" approach. Clients seeking to access a network may be denied access, or "quarantined," if they do not have the most up-to-date protective software. A quarantined client may be given limited access to the network, sufficient to allow the computer to be "remediated," such as downloading updates to the protective software from a server.

SUMMARY OF INVENTION

This invention relates to sharing of update information between client computers in a network.

In one aspect, the invention relates to initiating communication between a first client and a second client. The relative update status of the first client and the second client is determined. Based on the relative update status, the first client may send update information to the second client.

In another aspect, the invention relates to a method of operating a computer system in which a second client communicates to a first client information concerning its update status. If the second client is out-of-date relative to the first client, the second client may receive from the first client update information that may be installed on the second client.

In a further aspect the invention relates to computer readable medium having computer-executable instructions that control a client in which those instructions are executed. The client receives update status from a second client. If the second client is out-of-date relative to the first client, the first client communicates update information.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

It would be desirable to increase the integrity of a networked computer system by increasing the ability of the system to remediate clients that pose a risk to the network because they do not contain or use the most up-to-date software. However, any increase in the level of protection should not unreasonably burden the network or network users and should be easily administered. As described below, an improved quarantine management system is provided in which client computers compare status and remediation information as part of peer-to-peer communications.

As used herein, a quarantine enforcement policy refers to an embodiment of the logic used to determine whether a client may be given access to a network based on the status of software on the client (also referred to as client "health"). The policy may be stored in a data structure as a set of criteria or rules that must be satisfied for a client to be granted network access. However, any suitable method of defining a quarantine enforcement policy may be used. Further, a quarantine enforcement policy may be just one part of a larger access control policy. Accordingly, reference to a grant or denial of network access based on the quarantine enforcement policy does not preclude the possibility that the client will be denied or granted access for other reasons.

Figure 1:
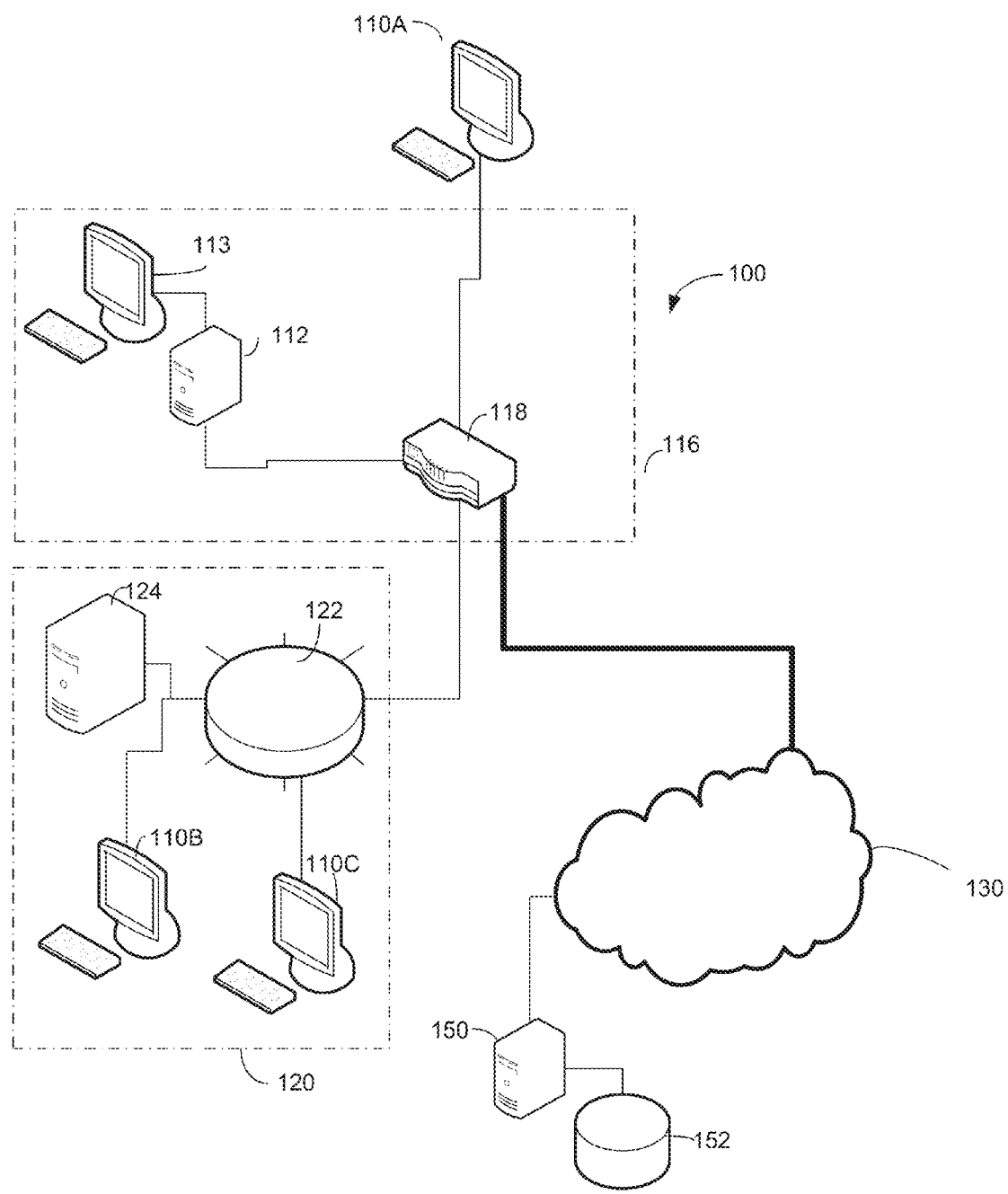
FIG. 1 is sketch of a network according to an embodiment of the invention.

FIG. 1 shows a sketch of a computer system 100, which may be constructed from devices as are used in conventional computer systems. However, computer system 100 differs from a conventional computer system in that devices within computer system 100 are programmed to implement an improved quarantine management system in which clients may exchange remediation information in a "peer-to-peer" communication.

As used herein, "peer-to-peer" communication refers to communications between two clients within a network. The communication may pass directly between the clients or may be routed through other network devices. Further, because devices connected in a network may be programmed to perform different functions at different times, a network "peer" is not limited by any specific hardware configuration. Hardware that in some instances is programmed to act as a server or play another roll in the network may, in other instances, act as a network peer.

Computer system 100 includes a managed network 120. In this example, managed network 120 may be a network within a company or enterprise. Alternatively, managed network 120 may be a domain or other portion of a larger network. Managed network 120 is managed by an individual or entity that provides access policies for the network. A person or entity who provides these network management functions is referred generally to as "a network administrator." In a networked computer system, there may be multiple people or entities providing network management functions, any or all of which may be generally referred to as a network administrator.

As is shown in FIG. 1, managed network 120 includes network devices such as server 124 and clients 110B and 110C. Here a wide area network (WAN) 122 is shown interconnecting the network devices. This configuration is shown for simplicity of illustration. A managed network may contain more devices than illustrated in FIG. 1. Likewise, a single WAN 122 is shown, but a managed network may contain different or additional interconnection architectures.

Devices may connect to managed network 120 through access point 116. Each of the clients 110B and 110C within managed network 120 may similarly be connected through access point 116 or other similar access point. The example of FIG. 1 shows that client 110B and 110C have already been given access to managed network 120. Therefore, their connection through an access point is not expressly shown. Clients 110B and 110C are peers to each other within network 120.

FIG. 1 shows client 110A seeking to connect to managed network 120 through access point 116. Access point 116 may be a wireless access point, hard wired access point or any other type of access point, whether now known or hereafter developed. In the example of FIG. 1, access point 116 includes a switching device 118 and a server 112.

Switching device 118 represents any of a number of types of switching devices that may be incorporated into an access point. Switching device 118 may be a device such as a router, switch, hub, gateway, or any other suitable switching device.

In operation, server 112 acts as an access control server. Server 112A may be a server as is conventionally referred to as a "RADIUS" server, an "IAS" server or a level 2 access control server. However, any suitably programmed server may be used. Server 112 is programmed to grant or deny network access in accordance with a quarantine enforcement policy. As a client, such as client 110A, seeks access to managed network 120, server 112 determines whether client 110A should be given access to managed network 120.

Access point 116 is here shown to alternatively or additionally allow client 110A to connect to networks or devices outside of managed network 120 even if denied access to managed network 120 (i.e., the client is "quarantined.") In the embodiment illustrated in FIG. 1, switching device 118 may allow client 110A to access the Internet 130. Through Internet 130, client 110A may reach devices such as server 150.

Server 150 acts as an update server. In the embodiment illustrated, server 150 is coupled to database 152. Database 152 may contain software updates for software executing on client 110A. Updates stored in database 152 may include updates to antivirus software, antispyware software or other software that may alter the "health" of client 110A. If client 110A is denied access to managed network 120 because its protective software is out-of-date, client 110A may nonetheless connect to update server 150 to obtain updates to its protective software.

Database 152 may contain software updates in the form of data files that may be downloaded to operate with protective software on client 110A. For example, data files that contain virus signatures or other threat signatures may be downloaded for use in conjunction with antivirus or antispyware programs. Alternatively, database 152 may contain patches for protective software executing on client 110A. A patch is a representation of updated software, usually in compressed form and often created by encoding differences between one version of a software program and a later version.

Further, database 152 may contain patches for operating system or other general purpose software executing on client 110A. Though operating system software is not generally regarded as protective software, the status of operating system software may have a large impact on the health of client computer 110A. For example, hackers may try to discover and exploit weaknesses in operating system software. In response, as vulnerabilities in general purpose software are identified, software vendors may issue patches or other updates that modify the software to remove those vulnerabilities. Therefore, the extent to which a client has installed patches, particularly patches directed to removing vulnerabilities, may be regarded as an indication of the health of a client. In some embodiments, access server 112 is programmed to implement a quarantine enforcement policy in which access to managed network 120 is granted or denied based, at least in part, on whether patches directed to vulnerabilities in general purpose software have been installed on the client. In the example that follows, patches to operating system software will be used as an example of software updates that may be applied to a client to improve the health of the client. However, updates may be provided to the executable portions of software or to the data used by that software.

Client 110A may access software updates from update server 150 in response to commands from a user operating client 110A. Alternatively, client 110A may be programmed to automatically access update server 150 in response to being denied access to managed network 120. In this way, a client that lacks sufficient health to be admitted to managed network 120 may nonetheless be "remediated" so that it qualifies for access to managed network 120.

Figure 2:
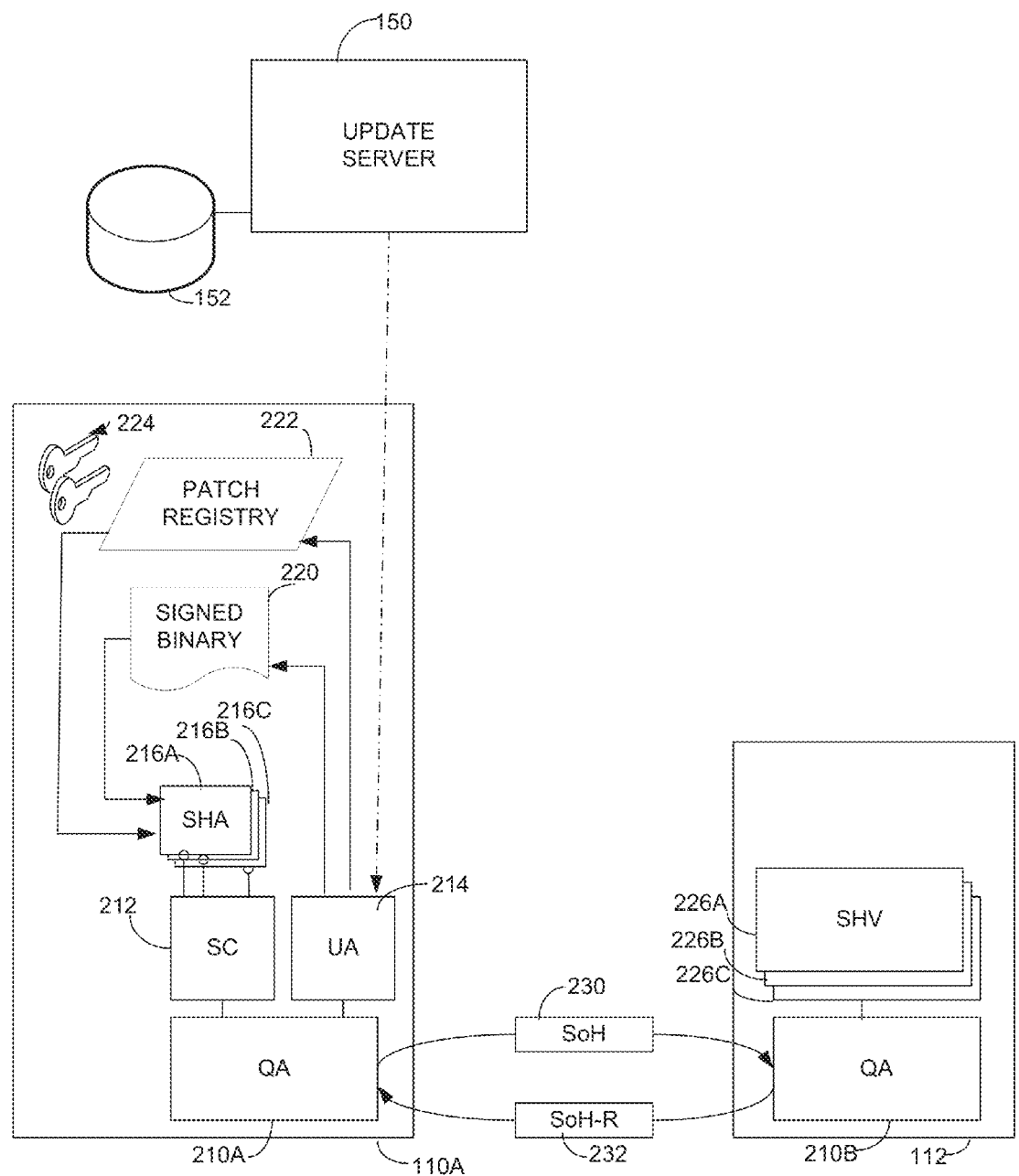
FIG. 2 is a software block diagram of software implementing a quarantine enforcement policy in the network of FIG. 1.

Turning to FIG. 2, a software block diagram of software within client 110A and access server 112 is shown. In the illustrated embodiment, the software is implemented as multiple components. Each component may be implemented as multiple computer-executable instructions stored in a computer-readable medium accessible to a computing device. The components may be implemented in any suitable language and may run on any suitable computing device. Conventional programming techniques may be used to implement the functions described in greater detail herein.

The software controls the devices in the network to operate in accordance with a quarantine enforcement policy, which may be specified by a network administrator. The update status of client software is in the given example, at least one factor considered in determining whether a client warrants access to the network in accordance with the policy. If access server 112 determines that the update status of the software within client 110A does not comply with the quarantine enforcement policy server 112 will deny access to client 110A. Client 110A may then download patches from update server 150 to bring itself into compliance with the quarantine enforcement policy. To obtain patches, client 10A includes update agent 214.

Update agent 214 is a software component that accesses update server 150 to obtain and install patches for operating system software within client 110A. Update agent 214 may, for example, periodically prompt a user of client 110A for permission to access update server 150 to check for new patches that have not yet been installed in client 110A. Alternatively, update agent 214 may operate in an automatic fashion, periodically obtaining patches without requiring a user of client 110A to take any action to initiate the update process.

In the embodiment illustrated, client 110A includes a quarantine agent 210A. Quarantine agent 210A gathers information concerning the status of client 110A and provides this status information as statement of health 230 to a quarantine agent 210B operating within access server 112. Statement of health 230 may contain any information necessary or desirable for quarantine agent 210B to determine whether client 110A has a health that entitles it to access to managed network 120 in accordance with the quarantine enforcement policy.

In the embodiment illustrated, the status information reflected in statement of health 230 defines the update status of software in the operating system of client 110A. In the exemplary embodiment, a portion of the information in statement of health 230 describes patches that have been installed to the operating system of client 110A. However, a quarantine enforcement policy may consider factors instead of or addition to the update status of operational system software. Therefore, statement of health 230 may contain multiple fields defining multiple types of information. Though for simplicity, only the patch status of software is expressly described as one example of update information in statement of health 230.

In the example shown in FIG. 2, a modular architecture is employed. Multiple system health agents (SHA) 216A, 216B, and 216C are illustrated. Each SHA obtains a specific type of status information. For example, one SHA may obtain status information concerning firewall software while another SHA may obtain information about antispyware software. Yet a further SHA may obtain information about the patch status of operating system software within client 110A.

The status information obtained by each SHA is passed through security center 212. Security center 212 aggregates status information and provides it to quarantine agent 210A. In this way, status information may be obtained about any protective software within client 110A by incorporating an SHA designed to obtain status information from or about that protective software.

At least one SHA obtains patch status information concerning the operating system software within client 110A. Such an SHA may determine the status of patches based on information generated by update agent 214. Any suitable method of determining the patch status of a client may be used. In the example of FIG. 2, patch registry 222 is used. Patch registry 222 may be implemented as a data structure within client 110A. Upon installing a patch, update agent 214 may make an entry in patch registry 222. Patch registry 222, in addition to storing an indication of the patch applied by update agent 214, may store other information useful in tracking the patch status of client 110A, such as the time at which the patch was created, obtained or installed.

The availability of information about patches installed in client 110A allows an SHA to generate patch status information by reading information stored by update agent 214 when it installs a patch. Consequently, information about installed patches may be included in statement of health 230 transmitted from client 110A to access server 112 as a portion of the interaction by which client 110A requests access to managed network 120.

Update agent 214 may be constructed to authenticate patches before installing them. In the example illustrated, update agent 214 downloads a patch as a signed binary file 220. Signing is a conventional process by which digital files are encoded with a "private key" issued by a certifying agency. The certifying agency makes available "public keys." The public key does not provide enough information to generate further signed files. But, the holder of the public key can apply the public key to a signed file to determine that the signed file was generated with a specific private key and has not been altered since it was generated.

Client 110A may have multiple public keys 224 associated with one or more certifying agencies. Such keys can be obtained from any suitable source, such as downloading them from certifying agencies. Alternatively, public keys from multiple certifying agencies are often provided with operating system software.

As update agent 214 downloads signed binary file 220, it applies a public key to the file. If update agents 214 successfully applies a public key 224 to signed binary 220, the authenticity of the file is verified. Upon verification of the signed binary 220 update agent 214 may install the patch contained within signed binary 220. In some embodiments, public keys 224 are obtained from a source trusted by a user of client 110A. By applying a trusted public key to an update signed with a corresponding private key, update agent 214 may determine it should "trust" that update because it originated from a trusted source and was not subsequently modified.

Once update agent 214 installs a patch, it may store the signed binary file for future use.

Server 112 includes a similar modular architecture that is adapted to respond to the request for access. Server 112 includes quarantine agent 210B that receives statement of health 230 from client 110A. Server 112 may include one or more statement of health verifiers (SHV), each processing a portion of the information contained within statement 230. In some embodiments, server 112 will include an SHV corresponding to each SHA in client 110A. In the example of FIG. 2, SHV 226A, 226B, and 226C are shown. In this example, one SHV in server 112 corresponds to an SHA in client 110A. However, the software within client 110A and server 112B may be modularized in any suitable fashion, and there is no requirement that each SHV correspond to an SHA.

In this example, an SHV within server 112 receives information from statement of health 230 defining the patch status of the operating system software within client 110A. This SHV determines whether, based on the patch status, client 110A complies with the quarantine enforcement policy. The determination made by the SHV is provided to quarantine agent 210B. Quarantine agent 210B aggregates the outputs from all of the SHVs and generates a response indicating whether client 110A qualifies for access in accordance with the quarantine enforcement policy. The decision may be provided by quarantine agent 210B to other software within access server 112 that manages access to managed network 120 according to conventional access control techniques.

In addition, quarantine agent 210B generates a statement of health response 232 that is sent to quarantine agent 210A within client 110A. If the quarantine agent 210B determines that the client 110A is not entitled to access, statement of health response 232 may indicate the reasons why client 110A does not comply with the quarantine enforcement policy.

Upon receiving a statement of health response 232 indicating that client 110A is quarantined, quarantine agent 210A may initiate remediation. If client 110A is quarantined because of the patch status of its operating system software, quarantine agent 210A may trigger update agent 211 to obtain patches from update server 150 to bring client 110A into compliance with the quarantine enforcement policy.

The software components pictured in FIG. 2 are useful in detecting clients that do not have the most current software (referred to as "out-of-date clients") only if the clients were out-of date when the client initially requested access to managed network 120. The approach illustrated in FIG. 2 is not useful in detecting clients that are out-of-date because updates became available after they connected to network 120. Further, remediation according to the approach illustrated requires each client seeking access to the network to download information from a server. Requiring every client to obtain updates from a server may undesirably increase network traffic. An increase in network traffic due to downloads would be particularly undesirable if each client accessed the update server 150 through a gateway or other network bottleneck. The approach for detection and remediation of out-of-date clients illustrated by FIG. 2 may be improved by allowing peer-to-peer updating.

Figure 3:
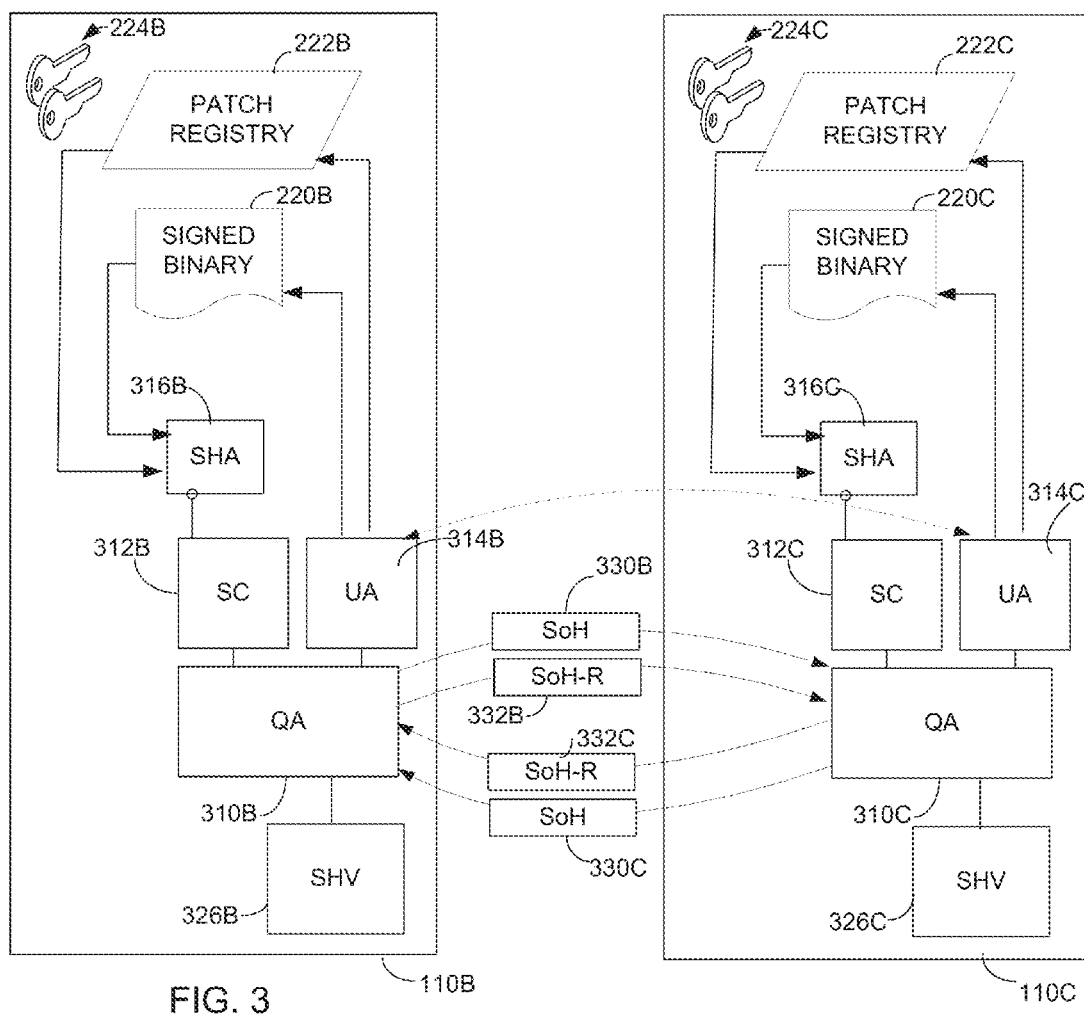
FIG. 3 is a software block diagram of software used in two client computers capable of performing peer-to-peer remediation according to an embodiment of the invention.

FIG. 3 shows an alternative embodiment of an update management system. Instead of or in addition to forcing clients to update software upon seeking access to managed network 120, detection and remediation of out-of-date clients may occur as part of establishing peer-to-peer communications between clients already granted access to managed network 120. For example, clients 110B and 110C are shown in FIG. 1 to have been granted access to managed network 120. At the time clients 110B and 110C were granted access to managed network 120, each complied with the quarantine enforcement policy then in effect. However, if subsequent to the time when either client 110B or 110C was granted access to manage network 120 either the quarantine enforcement policy changed or additional updates became available, one of clients 110B or 110C may contain out-of-date software.

As part of establishing a connection between client 1103 and 110C, the clients may exchange health information, allowing each client to determine whether the other client is more up-to-date. If one client is determined to be more up-to-date than the other, the more up-to-date client may provide updates it received to the more out-of-date client. As one client in a network obtains an update from an update server or other source, that update will propagate from client to client as the clients in the network engage in peer-to-peer communication. In this way, clients may receive updates at times other than when initially requesting access to managed network 120.

Further, by passing from a peer-to-peer within managed network 120, less load is placed on update server 150. Deploying updates is less likely to create bottlenecks in a path between managed network 120 and update server 150.

Peer-to-peer updating may be used regardless of the specific protocol used for communication between clients 110B and 110C. In the described embodiment, clients 110B and 110C communicate by first establishing a connection through a series of handshaking messages. Different protocols establish connections in different ways. For example, communications using a TCP protocol establish a connection called a "session." Alternatively, clients communicating using a UDP protocol assign ports that are thereafter used in communication. Other protocols and software systems establish connections in different ways and describe those connections with different terminology. Connections may, for example, be described as "pipes" or "sockets." Regardless of the specific name or format of a connection or layer in the network hierarchy at which a connection is established, an exchange of statements of health may be incorporated into the process of establishing a connection.

Turning now to FIG. 3, an example is provided of a software architecture that may be used to facilitate peer-to-peer updating. In the illustrated embodiment, each client contains the same software. At any given time, a client could either source or receive updates. Therefore, the software in both clients is adapted to either source or receive updates as part of peer-to-peer updating.

As illustrated in FIG. 3, client 110B includes a quarantine agent 310B that generates a statement of health 330B. Statement of health 330B is transmitted to client 110C as one part of the process of establishing a connection. Similarly, client 110C includes a quarantine agent 310C that generates a statement of health 330C that is transmitted to quarantine agent 310B within client 110B.

Each of quarantine agents 310B and 310C may generate a statement of health generally as described above in connection with FIG. 2. In the example illustrated, client 110B includes SHA 316B that may obtain data from patch registry 220B concerning patches installed in client 110B. This information may be provided through security center 312B to quarantine agent 310B for use in generating statement of health 330B. Similarly, client 110C includes SHA 316C that may obtain data from patch registry 222C in client 110C. This information may be passed through security center 312C to quarantine agent 310C for use in generating statement of health 330C.

In this embodiment, statement of health 330B and statement of health 330C contain the same format, which may be the same format as statement of health 230B (FIG. 2), However, a determination of update status made in connection with initiating peer-to-peer communication may involve checking the status of fewer elements of operation of each of clients 110B and 110C than are examined as part of applying the quarantine enforcement policy described in connection with FIG. 2. In an embodiment in which only the patch status of the operating system of each client is considered as part of a peer-to-peer update, statements of health 330B and 300C may contain only data relating to the patch status.

In generating a statement of health, each of the quarantine agents 310B and 310C performs functions comparable to those of quarantine agent 210A in client 110A (FIG. 2). Therefore, each client 310B and 310C includes at least one SHA, illustrated as SHA 316B and 316C, to obtain status information about the client.

Additionally, each of the quarantine agents 310B and 310C processes a statement of health it receives and generates a response. Therefore, each of the quarantine agents 310B and 310C performs functions similar to that of quarantine agent 210B contained within server 112. As in the embodiment of FIG. 2, information for a response generated by a quarantine agent is obtained from an SHV. Accordingly, clients 110B and 110C include SHV 326B and SHV 326C, respectively, Upon receipt of statement of health 330B, quarantine agent 310C provides status information from statement of health 330B to SHV 326C. As with the SHV described in conjunction with FIG. 2, SHV 326C compares the status information in the statement of health to criteria allowing SHV 326C to determine whether the client sending statement of health 330B requires an update.

SHV 326C could apply an algorithm comparable to that applied by an SHV in FIG. 2 to determine whether client 110B complies with a quarantine enforcement policy. Alternatively, SHV 326 may apply an algorithm in accordance with a peer-to-peer update policy that determines whether either of client 110B or client 110C should be updated by the other. In some embodiments, the peer-to-peer update policy dictates that the less up-to-date client receive an update from the more up-to-date client.

Such a policy may be applied, for example, if statement of health 330B contains a field identifying the most recent update time of software within client 110B, Upon receiving such information, SHV 326C may compare the most recent update time of client 110B with the most recent update time stored in patch registry 222C. However, any other suitable processing may be performed by SHV 326C to generate status information used by quarantine agent 310C to implement the peer-to-peer update policy.

Based on the status returned to quarantined agent 310C by SHV 326C, quarantine agent 310C generates a response 332C, Statement of health response 332C communicates to quarantine agent 310B information about the update status of client 110B. In the described embodiment, statement of health response 332C indicates to client 110B whether the software in client 110B is less up-to-date than the software in client 110C.

Quarantine agent 310B within client 110B performs functions similar to that of quarantine agent 310C. Specifically, quarantine agent 310B receives a statement of health 330C, describing the update status of client 110C. Based on the information contained in statement of health 330C and information in patch registry 222B, SHV 336B returns to quarantine agent 310B information about the update status of client 110C. Quarantine agent 310B uses this information to generate a statement of health response 332B that is transmitted to quarantine agent 310C. Statement of health response 332B indicates to client 110C whether its software is less up-to-date than the software in client 110D.

If, as a result of exchanging status information, clients 110B and 110C determine that one client contains less up-to-date software than the other, the client containing more up-to-date software may transmit stored binary files containing updates needed by the less up-to-date client. For example, if client 110B is more up-to-date than client 110C, SHV 326B may read patch registry 222B to identify patches installed in client 110B after client 110C was last updated. SHV 326B may then provide quarantine agent 310B with a list of signed binary files corresponding to those patches. Quarantine agent 310B may provide the list of patches to update agent 310B.

Update agent 314B may operate in a fashion similar to an update agent on update server 150 and source binary files. In this configuration, update agent 314B sources binary files for update agent 314C. Update agent 314C may receive the binary files and. install updates to the software in client 110C in the same fashion as if they had been downloaded from server 150.

Even when update files are transmitted from peer-to-peer, authentication to preserve the integrity of the update process is possible. Because each of the clients 110B and 110C includes public keys, such as 224B and 224C, either client may authenticate a signed binary file. Update agent 314C can confirm both the origin of a binary file and can confirm that the binary file has not been altered since it was generated. When clients are configured with trusted public keys, update agents 314C may determine whether to trust the update.

Update agents 314C may be configured to install updates from binary files received from another client only if the files are trusted.

The process of providing binary files containing updates can be performed in reverse when client 110C contains more up-to-date software than client 110B. In this scenario, update agent 314C acts as a source to update agent 314B. Update agent 314B receives a file, authenticates it and applies the update contained in the file.

The system pictured in FIG. 3 may operate according to any suitable peer-to-peer update policy. For example, the policy may require a limited form of quarantine when it is determined that one client contains out-of-date software. Specifically, one client may refuse to establish a connection with another client that contains out-of-date software. However, other policies are possible and it is not necessary that determination that one of the clients contains software that is less up-to-date than the other result in quarantine to force the out-of-date client to update. Updates by the out-of-date client may be "voluntary" such that a connection between a first client and the second client proceeds regardless of whether the more out-of-date client updates its software. As a further example of an alternative policy, the nature of the updates missing from the more out-of-date client may dictate whether updating is enforced through a quarantine or is voluntary. For example, some updates may be classified, as "critical" by a software vendor providing those updates. An up-to-date client may refuse to establish a connection with an out-of-date client missing critical updates but may otherwise establish a connection.

Regardless of what peer-to-peer update policy is used, it is not necessary that the more up-to-date client provide binary files to the more out-of-date client. A statement of health response indicating to a client that it is more out-of-date than the client with which it is establishing communications may alternatively trigger the out-of-date client to activate its update agent to download updates from an update server. In a further alterative embodiment, the more up-to-date client may provide binary files for updates when it has them available, but send a statement of health response to the out-of-date client indicating that the more out-of-date client should. update from an update server when the more up-to-date client does not have the binary files available. As yet a further alternative, the more out-of-date client may receive and install binary files from the more up-to-date client when available. But, if the more out-of-date client does not receive or cannot authenticate the binary files, the more out-of-date client may on its own initiate a download of updates from an update server.

Figure 4:
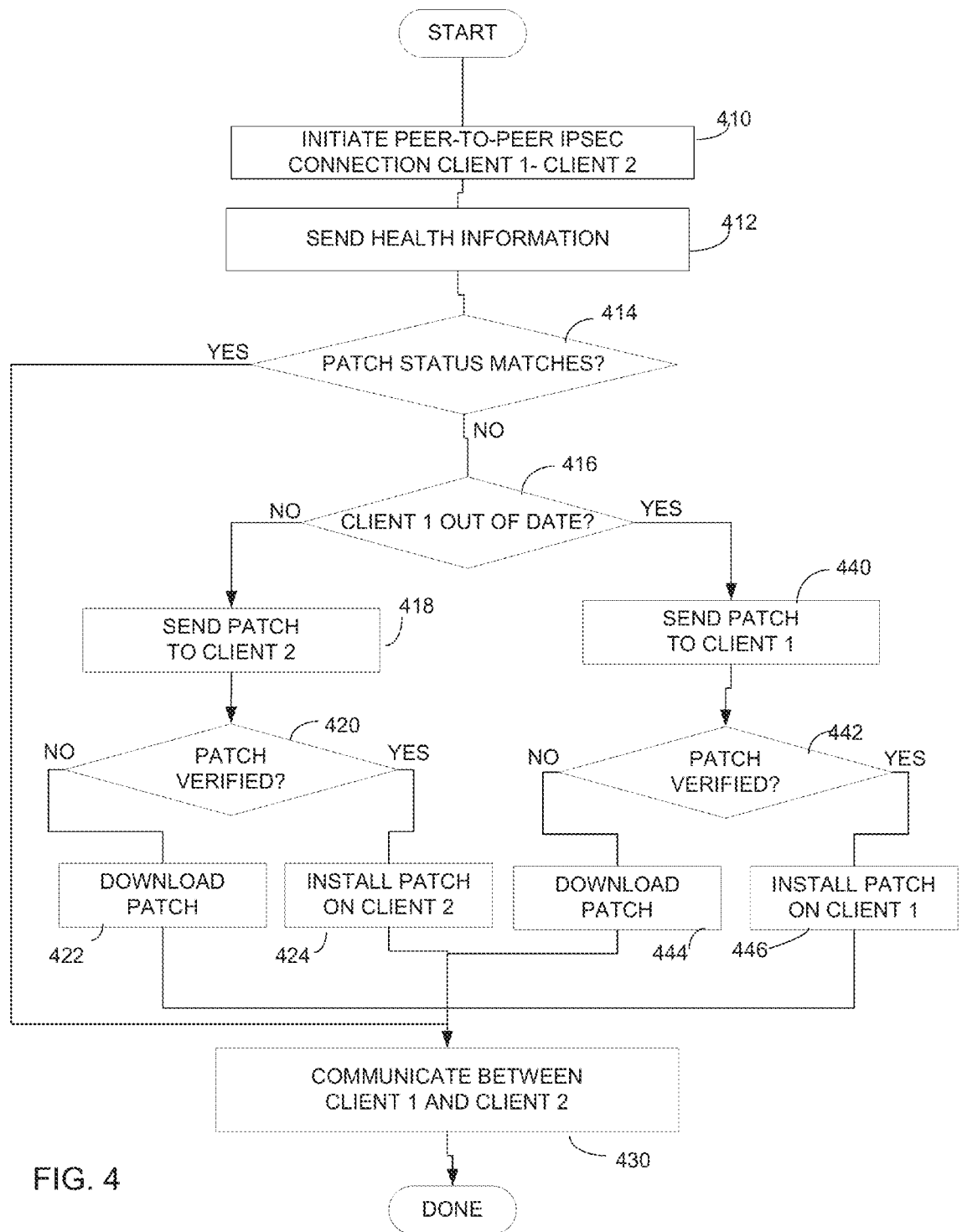
FIG. 4 is a flow chart illustrating a process by which the client computers illustrated in FIG. 3 may establish communication.

Turning now to FIG. 4, an example process by which clients as illustrated in FIG. 3 may operate is shown. The process begins at block 410 where Client 1 and Client 2 initiate a peer-to-peer IPSec connection. Though the process depicted in FIG. 4 may be used with communications in any format, use with IPsec connections may be advantageous. The IPsec protocol requires authentication of peers before establishing a connection. Authenticating that a client initiating a peer-to-peer communication is legitimately part of managed network 120 increases the integrity of the update management process. Further, the IPsec protocol specifies an authentication phase during which the exchange of status information may be readily accommodated.

Regardless of the specific communication protocol used, the process continues to block 412. At block 412 statement of health information is transmitted from at least one of the clients to the other. As shown in FIG. 3 each of the clients is capable of being either the source or the recipient of statement of health information. If the clients exchange statement of health information, either can determine which client is more up-to-date. Alternatively, if statement of health information is sent from only one client to the other, the recipient of the statement of health information may identify which of the clients is more up-to-date. If a determination of which client is more up-to-date is made by one client, that determination may be communicated to the other client in a statement of health response.

Regardless of which of the clients processes the statement of health information, the patch status of the two clients is compared at decision block 414. If each client has the same patch status, processing proceeds to block 430. At block 430 the clients may communicate without further effort to update either client.

Alternatively, if processing at decision block 414 determines that one of the clients is more up-to-date than the other, processing proceeds to decision block 416. At decision block 416, the process branches depending on which of the clients is more out-of-date. If Client 1 is not more out-of-date, processing proceeds to block 418. At block 418, Client 1 sends patch information to Client 2 so that Client 2 may attain the same update status as Client 1.

Upon receipt of a patch from Client 1, Client 2 attempts to verify the patch. Verification may involve determining the original source of the patch and whether the patch has been modified since it was generated. Verification may involve any suitable process, such as the use of public keys distributed by a certification agency. If Client 2 can verify the patch, processing proceeds to block 424. At block 424, the patch is installed on Client 2. Thereafter, Client 2 has attained the same update status as Client 1 and the process proceeds to block 430 where communication between Client 1 and Client 2 can take place.

Alternatively, if the patch as received at Client 2 cannot be verified, processing proceeds to block 422. In the process illustrated in FIG. 4, Client 2 downloads a patch from a download server if for any reason it cannot verify a patch provided by Client 1. As part of the processing in block 422, Client 2 installs the downloaded patch. Thereafter, processing proceeds to block 430 where Client 1 and Client 2 communicate.

Alternatively, if the processing at decision block 416 determines that Client 1 is out-of-date relative to Client 2, processing proceeds to block 440. At block 440, Client 2 sends a patch to Client 1 so that Client 1 may obtain the same update status as Client 2. At decision block 442, Client 1 attempts to verify the patch provided by Client 2. As described above in connection with decision block 420, Client 1 may use any suitable method for verifying the patch. If Client 1 is able to verify the patch, the process proceeds to block 446 where the patch is installed on Client 1. Alternatively, if Client 1 is unable to verify the patch, the process proceeds from decision block 442 to block 444. At block 444, Client 1 downloads and installs a patch from an update server.

Regardless of whether Client 1 receives a patch from Client 2 or a download server, the process proceeds to block 430 where Client 1 and Client 2 communicate.

Having thus described several aspects of at least one embodiment of this invention, it is to be appreciated that various alterations, modifications, and improvements will readily occur to those skilled in the art.

For example, a peer-to-peer update policy is defined in which updates are provided from one computer to another. Patches to operating system software are described as an example of one type of update that may be provided. Any update information may be provided as part of a peer-to-peer update process. Patches to other software, entirely new software or data files, such as those containing virus signatures, may be provided from one client to another.

Further, examples of alternative peer-to-peer update policies were provided. Software may be constructed to operated according to any one of these policies. Alternatively, software could be constructed to be configurable by a network administrator, allowing the network administrator to select any one or any combination of these policies.

Further, it is described that clients establishing a connection determine that one client is out-of-date relative to the other based on an exchange of status information. Any other method may be employed to determine that one client is missing an update that can be provided by another client. For example, either or both of the clients could consult an external source of information, such as an update server, about available updates.

Further, it is described that a peer-to-peer update policy is applied when two clients initiate a connection. The update policy could be applied at any point when two or more clients interact. Further, an interaction could be forced to cause the clients to apply the peer-to-peer update policy. Such a connection could be forced by periodically having each client contact other clients in the network. Such an approach may be desirable if performed as a background process in the clients in the network.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited. in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising a server computing device and at least one software module that are together configured for performing actions comprising:
   recognizing an attempt by a client to access the server computing device;
   determining whether a status of the attempting client complies with a quarantine enforcement policy, where the determining comprises receiving a statement of health from the attempting client, comparing the statement of health with the quarantine enforcement policy, and transmitting a statement of health response to the attempting client indicative of compliance with the quarantine enforcement policy, where the transmitted statement of health response comprises, in response to the status not complying with the quarantine enforcement policy, at least one particular patch that, when successfully installed on the attempting client, will cause the status to comply with the quarantine enforcement policy;
   allowing the attempt in response to the status complying with the quarantine enforcement policy, the allowing the attempt resulting in the attempting client succeeding in accessing the server computing device; and
   denying the attempt in response to the status not complying with the quarantine enforcement policy, the denying the attempt resulting in the attempting client failing to access the server computing device.

2. The system of claim 1 where the status comprises an update status of software installed on the attempting client.

3. The system of claim 2 where the software comprises an operating system.

4. The system of claim 2 where the software comprises patches installed on the attempting client.

5. The system of claim 1 where the statement of health response comprises a plurality of portions, and where each portion indicates a particular status that corresponds to a different software or patch installed on the attempting client.

6. The system of claim 5 where the status complying with the quarantine enforcement policy is based on each particular status complying with the quarantine enforcement policy.

7. The system of claim 1, the actions further comprising identifying patches that, when installed on the attempting client, are sufficient to bring the attempting client into compliance with the quarantine enforcement policy.

8. A method performed on a server computing device, the method comprising:
   recognizing an attempt by a client to access the server computing device;
   determining whether a status of the attempting client complies with a quarantine enforcement policy, where the determining comprises receiving a statement of health from the attempting client, comparing the statement of health with the quarantine enforcement policy, and transmitting a statement of health response to the attempting client indicative of compliance with the quarantine enforcement policy,
   where the statement of health response comprises, in response to the status not complying with the quarantine enforcement policy at least one particular patch that, when successfully installed on the attempting client, will cause the status to comply with the quarantine enforcement policy;
   allowing the attempt in response to the status complying with the quarantine enforcement policy, the allowing the attempt resulting in the attempting client succeeding in accessing the server computing device; and
   denying the attempt in response to the status not complying with the quarantine enforcement policy, the denying the attempt resulting in the attempting client failing to access the server computing device.

9. The method of claim 8 where the status comprises an update status of software installed on the attempting client.

10. The method of claim 9 where the software comprises an operating system.

11. The method of claim 9 where the software comprises patches installed on the attempting client.

12. The method of claim 8 where the statement of health response comprises a plurality of portions, and where each portion indicates a particular status that corresponds to a different software or patch installed on the client.

13. The method of claim 12 where the status complying with the quarantine enforcement policy is based on each particular status complying with the quarantine enforcement policy.

14. The method of claim 8 further comprising identifying patches that, when installed on the attempting client, are sufficient to bring the attempting client into compliance with the quarantine enforcement policy.

15. At least one storage device storing computer-executable instructions that, when executed by a server computing device, cause the server computing device to perform actions comprising:
   recognizing an attempt by a client to access the server computing device;
   determining whether a status of the attempting client complies with a quarantine enforcement policy, where the determining comprises receiving a statement of health from the attempting client, comparing the statement of health with the quarantine enforcement policy, and transmitting a statement of health response to the attempting client indicative of compliance with the quarantine enforcement policy,
   where the statement of health response comprises, in response to the status not complying with the quarantine enforcement policy at least one particular patch that, when successfully installed on the attempting client, will cause the status to comply with the quarantine enforcement policy;

allowing the attempt in response to the status complying with the quarantine enforcement policy, the allowing the attempt resulting in the attempting client succeeding in accessing the server computing device; and denying the attempt in response to the status not complying with the quarantine enforcement policy, the denying the attempt resulting in the attempting client failing to access the server computing device.

16. The at least one storage device of claim 15 where the status comprises an update status of software installed on the attempting client.

17. The at least one storage device of claim 16 where the software comprises an operating system, or where the software comprises patches installed on the attempting client.

18. The at least one storage device of claim 15, the actions further comprising identifying patches that, when installed on the attempting client, are sufficient to bring the attempting client into compliance with the quarantine enforcement policy.

19. The at least one storage device of claim 15 where the statement of health response comprises a plurality of portions, and where each portion indicates a particular status that corresponds to a different software or patch installed on the attempting client.

20. The at least one storage device of claim 18 where the identified patches are authenticated.

* * * * *